Figure 1:
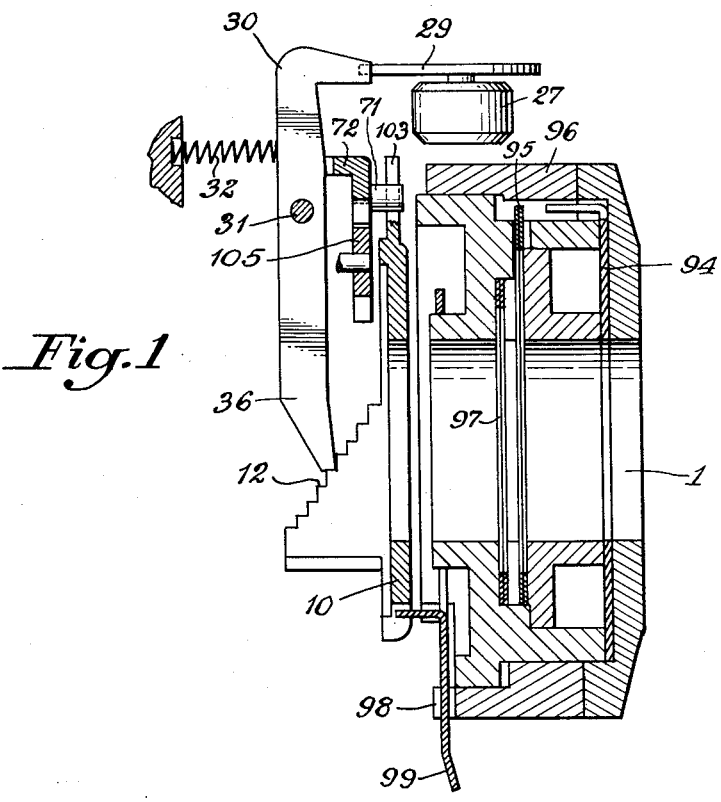

Dec. 18, 1962  E. SAUER ET AL  3,068,769
CAMERA WITH AUTOMATIC EXPOSURE CONTROL ACCORDING
TO TIME AND DIAPHRAGM APERTURE
Filed July 7, 1960  4 Sheets-Sheet 1

United States Patent Office 3,068,769
Patented Dec. 18, 1962

3,068,769
CAMERA WITH AUTOMATIC EXPOSURE CONTROL ACCORDING TO TIME AND DIAPHRAGM APERTURE
Edgar Sauer and Johann Hahn, Stuttgart, Germany, assignors to Zeiss Ikon Aktiengesellschaft, Stuttgart, Germany
Filed July 7, 1960, Ser. No. 41,303
Claims priority, application Germany July 18, 1959
9 Claims. (Cl. 95—10)

The invention relates to photographic cameras in which the determining exposure time and diaphragm aperture values are automatically obtained and set in correspondence with light values produced by an illumination meter.

The principal object of the invention is to provide a camera of the type indicated which operates fully automatically according to exposure time and diaphragm aperture and excludes every possibility of arbitrary influencing or selection of said exposure factors and, therefore, requires neither special training nor mental deliberation for its operation.

A fundamental object of the invention is to provide a camera of the kind indicated in which the exposure time mechanism and the diaphragm aperture mechanism, preferably in an objective shutter, are so coupled with each other throughout a mutual adjustment range that adjustment in one direction decreases the exposure time and diaphragm aperture values while adjustment in the opposite direction increases both said values.

Another object of the invention is to provide a camera of the type indicated in which through the cocking of the camera (the film advancing and shutter winding) the exposure time and diaphragm aperture determining means are brought into one end position of the adjustment range while said means through the release of the camera moves towards the other end position of the range until engaged by a catch member controlled by an electric exposure meter, whereupon the shutter is automatically released.

A further object of the invention is to provide a mechanism of the kind indicated in which the exposure time and diaphragm aperture means in the case of a cocked camera are adjusted to the end position of the range corresponding to maximum values and in the case of release of the camera assume decreasing values. Then the camera can also be made as a single eye mirror reflex camera with automatic mirror control, preferably with an objective shutter having a controllable device for opening the shutter for intermediate viewing. Provisions are also made for disconnecting the means for automatic exposure control from the exposure time and diaphragm aperture mechanisms in order to accommodate to special conditions, such as flash light photography.

The catch means which during the camera release limits the reverse movement of the exposure time and diaphragm aperture mechanisms from one end position of the range towards the other, comprises in the inventive camera abutment stairs cooperating with a catch member that is controlled by an electric exposure meter. In dependence upon the prevailing light conditions, said catch member assumes different positions relative to the abutment stairs by means of the indicator of the measuring device of the exposure meter which is clamped in position in accordance with the sensing result and as soon as at the camera release the reverse movement of the exposure time and diaphragm aperture mechanism is initiated said catch member will sooner or later engage said stairs and thereby establish the exposure time and diaphragm aperture values.

The shutter release is also automatically effected through a member which is likewise set in motion at the reversal of the exposure time and diaphragm aperture mechanisms. Difficulties may arise here if the shutter release is effected before the exposure time and diaphragm aperture mechanisms have arrived in their predetermined adjustment or setting positions. According to the invention, this is avoided thorugh the provision of means which subject the release of the abovementioned release means to such a timed relation to the also moving exposure time and diaphragm aperture mechanisms as to ensure the required properly timed succession of camera setting and shutter release.

For obtaining said properly timed succession delaying means may serve which influence the movement of the release means in such a way that the shutter release does not occur until after completed exposure time and diaphragm aperture adjustment. Preferably, a mechanical escapement mechanism is employed which acts upon the shutter release means itself or upon an element connected therewith.

The correctly timed succession of the camera setting and the shutter release may also be achieved by means of a differential gear means which is provided between the shutter release element and one of the setting means itself or an element connected therewith.

The inventive automatic camera differs essentially from a known device for diaphragm aperture adjustment and, in certain cases, also exposure time setting in photographic apparatus for flash light exposures in which it is also true that with the camera release the exposure time and diaphragm aperture mechanisms begin to move from a border position and are stopped by engagement of an abutment member with the clamped indicator of the light measuring instrument, while the shutter release member arrives in the end position with delay, but in which known device no abutment stairs are employed. The exposure time and diaphragm aperture mechanisms are furthermore directly brought up to the instrument indicator by the mentioned sensing element which is not practically feasible due to the hard impact engagement caused by the strong springs of the setting mechanisms. The indicator clamping sustains, as has been proven, in this structure at the most the impact of one setting mechanism, e.g., that of the diaphragm aperture mechanism, which leads to restriction to a semiautomatic mechanism. The fully automatic control of both setting mechanisms in dependence upon the indicator position of the measuring instrument can be obtained only by means of the inventive camera since here the sensing takes place in two relay steps, i.e., with intermediate operation of the abutment stairs with the catch member.

Details of the invention are explained below with reference to the shown embodiments, functionally equivalent members in the embodiments bearing the same reference marks.

Figure 7:
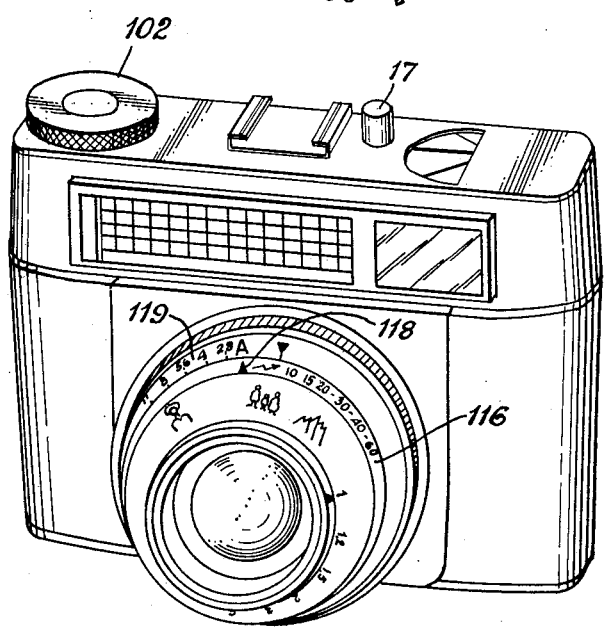
Figure 2:
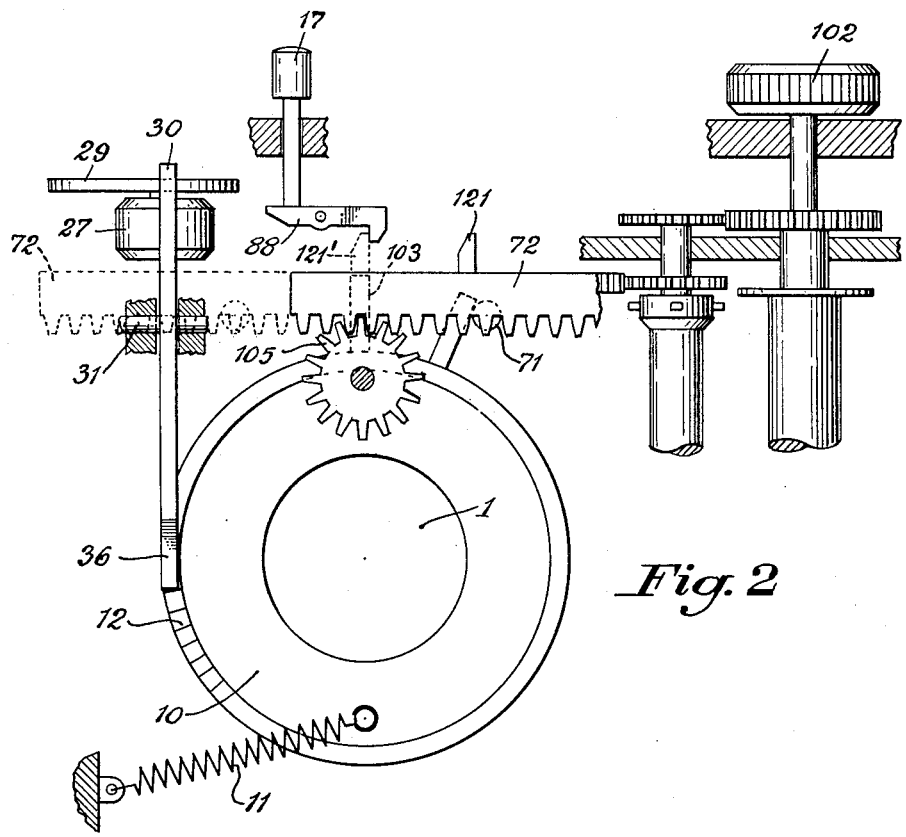
Figure 3B:
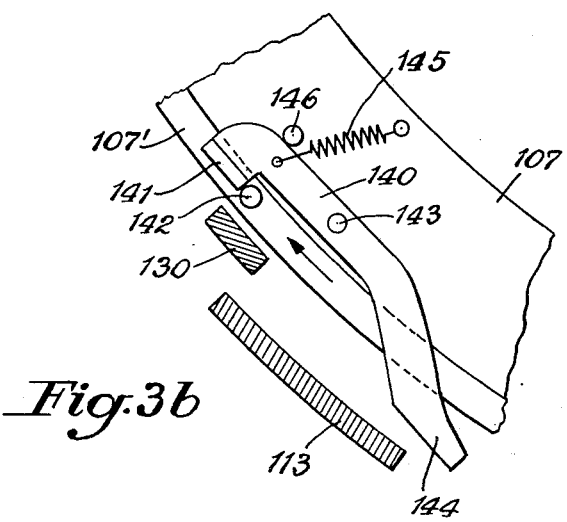
Figure 5:
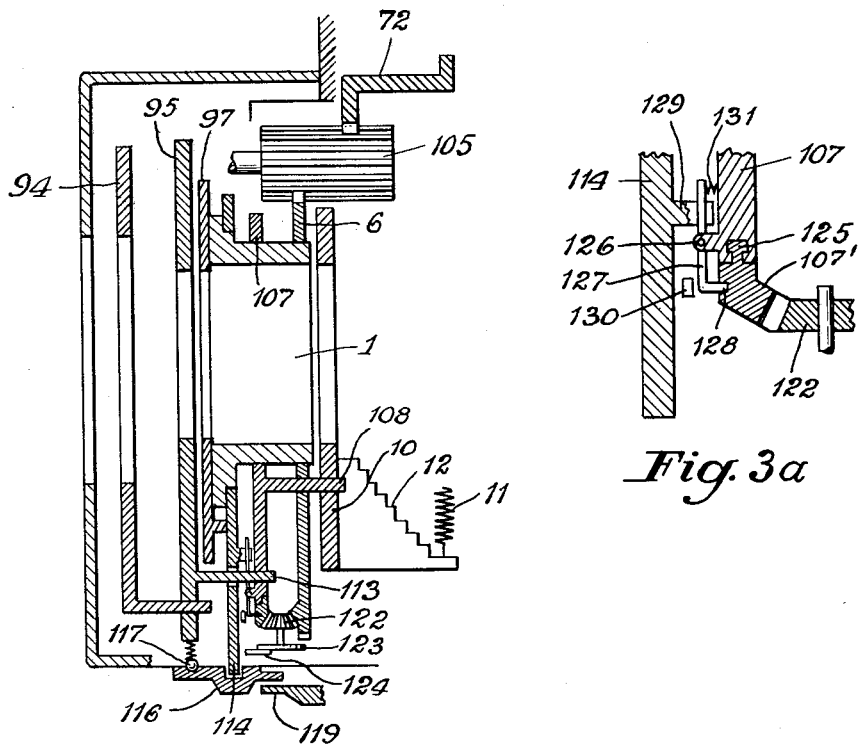
Figure 5:
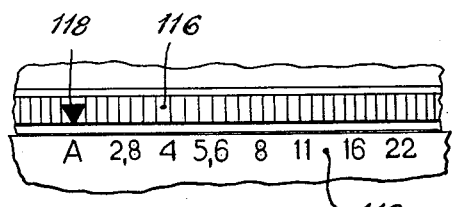
Figure 4:
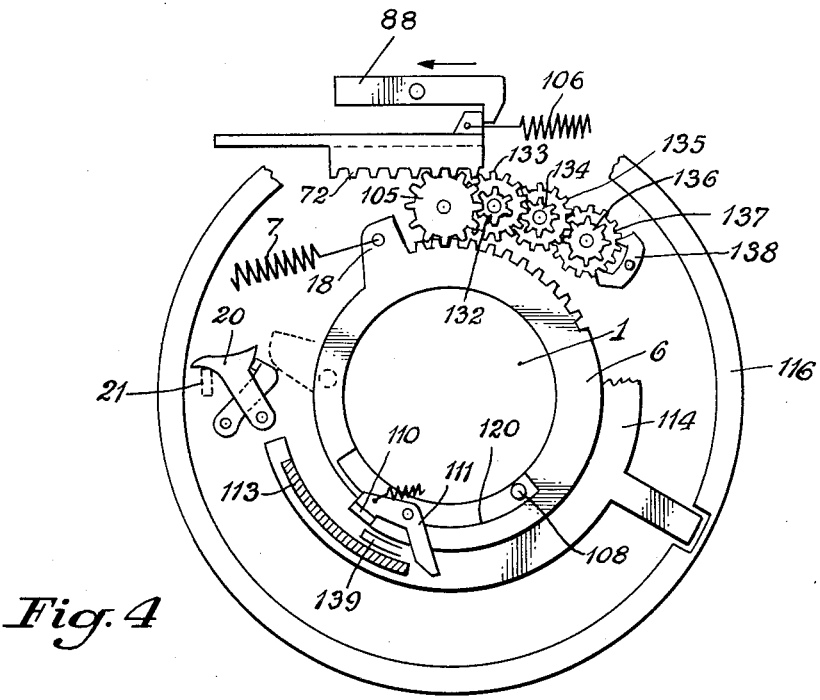
Figure 6:
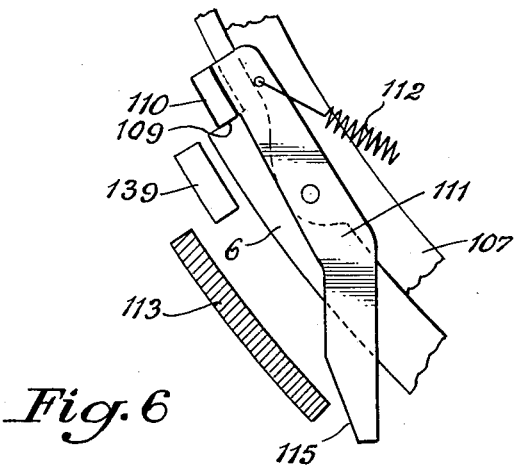

FIGS. 1 and 2 show the basic structure of the inventive automatic camera in vertical axial cross-section and rear elevation, respectively, FIG. 3 is an axial diagrammatic cross-section of an embodiment having a differential gear means between the release member and a ring connected with the exposure time and diaphragm aperture mechanisms, FIG. 3a is an enlarged illustration of a detail of FIG. 3, FIG. 3b shows in a similar manner an alternative to FIG. 3a, FIG. 4 is a front elevation of an embodiment provided with an escapement mechanism, FIG. 5 shows a detail of FIG. 3, FIG. 6 shows a detail of FIG. 4 on an enlarged scale, and FIG. 7 is a perspective view of a camera according to the invention.

As shown in FIGS. 1 and 2, a central shutter of conventional structure with tension axle and release means is journalled about the objective opening 1 together with a light value ring or axle. Its exposure time, or shutter speed, ring 94 and diaphragm aperture ring 95 are by means of the light value ring 96 connected with each other in such a manner that for long exposure periods large diaphragm apertures and for short exposure periods small diaphragm apertures are obtained. The second diaphragm aperture cage 97 holding the diaphragm segments is anchored in the shutter. The light value ring 96 is for adjustment according to film sensitivity provided with recesses 98 in which a lever 99 connected with a disc 10 can be engaged. Thereby the disc 10 which also is rotatable about the optical axis, may be coupled with the light value ring 96 in different rotary positions. The intervals correspond to the sensitivity intervals of the films. The disc 10 is provided with abutment stairs 12 having the steps axially offset. In the movement region of the abutment stairs 12 an arm 36 of a lever that is pivotable about the axle 31, is movable in the axial direction as a catch member. The other arm 30 of the lever is under the action of a spring 32 held in engagement with a cam disc 29 which is connected with the rotary coil of the instrument 27 in an exposure meter. The cam disc 29 changes its position in accordance with the light value obtained by the instrument 27 from the current of a photoelectric cell (not shown) for the light conditions existing at any particular time. The feeler arm 30 of the lever 30, 36 adopts this position and transmits it to the catch arm 36.

FIGS. 1 and 2 show the camera mechanism after an exposure in released condition; the disc 10 is still retained in the catch position of the previous exposure. For cocking the camera the film advancement knob 102 is rotated. Through the intermediary of a gear rack 72 and a projection 71 thereon which cooperates with an arm 103 on the disc 10, said disc 10 is rotated in the counter-clockwise direction (FIG. 2) and against the action of a return spring 11, whereupon at the end of the cocking distance a blocking of the disc 10 occurs which prevents reverse rotation thereof. In this cocked condition, the abutment stairs 12 have their bottom step, which corresponds to the lowest light value settable in the shutter, in the movement region of the freed catch member 36. The light value ring 96, the exposure time ring 94, and the diaphragm aperture ring 95 have due to their coupling with the disc 10 participated in the cocking movement. The diaphragm is now fully open and the shutter is conditioned for the longest exposure time. Furthermore, in a manner known per se, the shutter mechanism has been cocked by the gear rack 72 through the intermediary of the pinion 105. At the end of the cocking distance, the entire mechanism is held in cocked position through a latch 88 which engages behind a projection 121 on the gear rack 72, whereby the latch 88 is disposed in the region of movement of a camera release member 17. At 121' the position of the projection 121 in the cocked position is indicated in broken lines.

For an exposure the camera release member 17 is pushed. It releases the latch 88 from the projection 121. The disc 10 is freed and returns in the clockwise direction. This permits the exposure time ring 94 and the diaphragm aperture ring 95 to move with said disc 10 towards reduced values until a step of the abutment stairs 12 engages the catch arm 36 and the moving system 10, 12, 94, 95, 96 is stopped in a position in which the diaphragm aperture and the exposure time with due regard to the film sensitivity setting at 98, 99 are automatically adjusted in correspondence with the light value obtained from the instrument 27.

In the embodiment of FIG. 3 the correctly timed coordination of camera setting and shutter release is effected by a differential gear which includes a release ring 6 and a ring 107 as sun wheels and a drive element 122 for a planet wheel ring 123 as planet wheel, said planet wheel rim 123 being provided with an actuation member 124 for the shutter release means. As in the previously described embodiments, in the cocking procedure the film is advanced, the shutter is cocked, and the release ring 6 is rotated through the intermediary of the members 72 and 105. Thereby the planet wheel 122 and the planet wheel rim 123 are first rotated until the actuation member 124 after idle passage over the shutter release member comes into engagement with an abutment element. The ring 107 as well as the diaphragm aperture ring 95 and exposure time ring 94 which are fixedly connected thereto have, depending upon how readily rotatable they are, either been immediately caused to participate in said rotary movement or begin to rotate at the moment the planet wheel rim 123 is brought into said engagement with the abutment element. At the conclusion of the film advancement and shutter cocking, said rings 107, 95, 94 arrive in their intended end position in which the diaphragm is fully open and the shutter is adjusted to the maximum exposure time. In this position the entire mechanism remains locked through the latching between members 88 and 121 until the camera release.

With the disengagement of the members 88, 121, effected through actuation of the camera release member, the automatic mechanism begins to operate. Through engagement of the catch member 36 with the abutment stairs 12 the return movement of the diaphragm aperture ring 95 and exposure time ring 94 is concluded and the illumination factors corresponding to the meter indication are set. While now the members 94, 95, and 10 and thereby also the sun wheel 107 connected therewith remain at rest, the release ring 6, which constitutes the second sun wheel in the differential gear, runs off in the direction opposite to the cocking direction and the planet wheel rim 123 rotating therewith in relation to the halted sun wheel 107 releases the shutter by means of the actuation member 124. Thereby it is attained that the shutter release does not occur until after concluded camera setting, the proper delay being established through appropriate spacing of the actuation members and adjustment of distances to be traversed.

The embodiment of FIG. 3 is also provided with means for disengaging, or bypassing, the automatic mechanism in order to enable the making of flash light exposures. For this purpose, as shown with particular clarity in the enlarged representation of FIG. 3a, the ring 107 is divided at 125 and a device, such as a latch 127 pivotally mounted at 126, is provided which couples the members 107 and 107' together in that the latch 127 in operative position with its nose 128 engages in a kidney-shaped recess in the member 107', which is provided with bevel gears, and thereby enables the ring 107 to operate as a unitary element. If, on the other hand, this condition which is required for the automatic operation, is to be suspended in favor of flash light operation, actuation of an adjacent ring 114 is required which on its outer finger grip surface 116 is provided with an index 118 cooperating with a stationary scale 119, as shown in FIG. 5. The stationary scale includes the marking A, which indicates the automatic setting, and also instead of the guide members the diaphragm aperture values required for flash light operation with predetermined constant group exposure distance.

If change from automatic operation to flash light operation is to be made, cocking of the camera is necessary. Thereby the diaphragm aperture and exposure time members, as explained above, move to their positions of maximum values which here may be 2.8 for the diaphragm aperture and 1/30 second for the exposure time. The ring 114 is provided with an inclined control member 129 which in the A position of this ring does not arrive within the range of the correspondingly bevelled latch 127 since the rings 6 and 107 in automatic operation perform only back and forth movements of such angularities as to not permit an encounter between the elements 129 and 127. If, on the other hand, the finger grip surface 116 is moved from the automatic operation position A to a diaphragm aperture position, the latch is moved away from the ring part 107' and stopped against a casing abutment 130 by means of the control member 129 the control range of which corresponds to the entire diaphragm aperture range. Thereby, the ring 107 together with the rings 94 and 95 are immobilized and incapable of further rotation. The exposure time is locked at 1/30 second and the adjustment of the diaphragm aperture takes place by means of the second rotary diaphragm cage 97 which, as mentioned above, forms a diaphragm differential with the other diaphragm cage 95.

The camera can in this way under manual selection of diaphragm aperture be utilized for flash light exposures. The cocking of the shutter and film advancement means can, as before, be effected through operation of the cocking knob 102, the gear rack 72, the pinion 105, and the release ring 6, the ring part 107' thereby being brought along idly by the planet wheel 122. At return to A position which also must be performed in cocked condition of the camera, the latch 127 again engages the ring part 107' and the automatic operation may be resumed immediately. Preferably, the latch is provided with a spring 131 which ensures its proper operation.

An alternative solution of the releasable latching between the sun wheel 107 and the bevel gear member 107' cooperating therewith may be achieved through the arrangement shown in FIG. 3b. In this arrangement, a latch 140 pivotally mounted on the ring 107 at 143 is provided which through a spring 145 secured to the ring 107 or to a part of the camera casing is pulled against a stop member 146 on the sun wheel 107. The nose 141 projecting beyond the profile of the latch 140 engages a projection, such as a pin 142, on the bevel gear member 107', the height of said projection being such as to cause it to be engaged by the nose 141 but capable of passing below the profile of the latch 140 when the latter is rotated. A stationary abutment member 130 is also provided and in addition a ridge 113 on the ring 114 which extends over all the diaphragm aperture intervals and cooperates with the end portion 144 of the latch.

In automatic operation, the sun wheel 107 is brought along by the bevel gear member 107' driven in the clockwise direction by the elements 105, 6, and 122. Upon release, the members 105, 6, 107', 107, 10, 95, and 94 participate in the rotation until the catch member arrives in engagement with the stairs 12. Thereby the rings 10, 107, 94, and 95 are stopped. The sun wheel 6 continues through the intermediary of the planet wheel 122 to drive the bevel gear member 107' until the latter is brought to rest by engagement with a stop member corresponding, for instance, to the light value 18. The planet wheel 122, now rotating on the stationary bevel gear member 107', then pushes by means of the actuation member 124 of the rotating planet wheel rim 123 upon the shutter release member, whereby the exposure is accomplished.

If change is to be made from automatic operation to flash light operation it is as in the embodiment previously described only necessary to again operate the ring 114. Through the ridge 113 hereon the latch 140 is by means of pressure on the latch end portion 144 rotated in the counterclockwise direction so that the locking between the latch nose 141 and the pin 142 on the bevel gear member 107' is removed, the bevel gear member 107' thereby rendered freely rotatable relative to member 107 and furthermore, the latch nose 141 stopped against the abutment member 130 which is secured to the camera casing. Thereby, the sun wheel 107 and the rings 10, 94, and 95 connected therewith are stopped; the exposure time is—provided the camera is cocked—established at 1/30 second and the diaphragm adjustment occurs again over the second rotary diaphragm cage 97.

Through manual selection of diaphragm aperture the camera can now be used for flash light exposure. Cocking of the shutter and advancing of the film may be accomplished through operation of the cocking knob 102 and through the intermediary of the gear rack 72, the pinion 105, and the release ring 6, whereby the bevel wheel member 107', driven by the planet wheel 122, rotates idly on the blocked sun wheel 107. In reverting to automatic setting, the latch 140 with the nose 141 due to the return movement of the ridge 113 again moves away from the abutment member 130 and, pulled by the spring 145 into engagement with the stop member 146, again arrives into position before the pin 142 on the bevel gear member 107'. Thereby the blocking of the rings 94, 95, 107, and 10 is again discontinued and the cooperation of the sun wheel 107 with its bevel gear member 107' is again established.

Instead of the described and shown latches, any other suitable releasable coupling means may be used. The same is true for the inactivation of the ring 107 or a portion thereof in the transfer chain from cocking knob 102 to exposure time ring 94. Any other suitable disconnecting means may be used therein.

In the embodiment of FIG. 4, which is a front elevation of the camera in cocked condition, an escapement anchor 138 acting on the pinion 105 through the intermediary of a gear chain 132—137 is provided for delaying the operation of the release ring 6 upon camera release. Naturally, such an escapement mechanism could also be provided for direct action upon the ring 6. In order to effect operation of the other rings by means of the ring 6 during the cocking and free return movement of said ring 6 independently of the balance of the mechanism in the release movement, a releasable connection between the ring 6 and, the other rings is provided which comprises the coupling means 110—139 and is shown in FIG. 6 on an enlarged scale. It consists in that a shoulder 109 on the release ring 6 engages the nose 110 of a latch 111 pivoted on the ring 107 and thereby makes said ring 107 participate in the movement. A spring 112 maintains the latch nose 110 in the path of the shoulder 109. The spring 112 may be secured to the ring 107 or to the camera casing. In the latter case the spring 112 also operates to return the ring 107. The release ring 6 which during cocking rotated in the clockwise direction and through the latching by means of member 111 brought with it the ring 107 and the associated rings 94 and 94 rotates alone back in the return movement associated with the release upon setting of the camera, whereby the delay imposed upon said ring 6 in the return movement does not permit release of the shutter until after completed adjustment of the diaphragm aperture and exposure time. As is plainly shown in FIG. 6, the latching at 109, 110 with the ring 107 constitutes a unidirectionally, i.e. in the cocking direction, operative coupling which in the opposite rotary direction of the relase ring 6 is without effect.

In addition, in the position of the parts at cocked camera, a ridge 113 which is provided on an adjustment ring 114 (FIG. 3) rotatable about the optical axis, may act upon the latch 111, e.g. on its end portion 115, in such a manner that the nose 110 of the latch swings out of the path of the shoulder 109 on the ring 6 and engages behind a stationary projection 139 or in a recess in the camera casing. Then the automatic exposure control is disconnected through separation of the exposure time and diaphragm aperture mechanism, which here means the interconnected members 94, 95, 107, 108, 10, 12, from the cocking mechanism 70, 105, 6 and through retainment of the exposure time and diaphragm aperture mechanism in the cocked position. For rotation of the adjustment ring 114 which by means of the ridge 113 controls the latch 111, the ring 116 serves which surrounds the shutter. A coupling means 117 or some other suitable stop mechanism retains it in its adjustment positions.

The ring arrangement 114, 116 is in addition to its function as a shift means utilized for the introduction of exposure factors for special purposes, e.g., for adjustment of the diaphragm aperture to flash light exposure. For this purpose, the adjustment ring 114 is also in this embodiment connected with the rotary second diaphragm cage 97. Accordingly, in manual operation of the camera essentially the same means are utilized for the setting of the exposure time and diaphragm aperture values as in the automatic operation of the camera serve to establish the exposure values. The actuation ring 116 is adjustable in relation to a series of stationary markings with the aid of its indication mark 118 (FIG. 5). Said markings comprise the mark "A" (automatic) and a scale 119. The scale may be provided with diaphragm aperture values, as shown, or/and with guide numbers for flash light exposure (guide number=distance in meters × diaphragm aperture value). In the case of marking with guide numbers a constant exposure distance is assumed.

The setting of the actuation ring 116 on "A" applies to the normal use of the camera with operation of the automatic exposure control. Thereby the ridge 113 on the adjustment ring 114 assumes a position in which it holds the latch nose 110 away from the casing stop member 139 and has admitted it into the range of the shoulder 109 of the release ring 6. The ring 107 participates now in the cocking movements and the oppositely directed release movements of the release ring 6 and the same applies to the disc 10 with its abutment stairs 12 and the exposure time ring 95.

For flash light exposures, the actuation ring 116 is adjusted with its mark 118 to the appropriate value on the scale 119 when the camera is in cocked condition. With the transfer from the setting "A" to the first scale value the ridge 113 thereby guides the latch nose 110 out of the range of the shoulder 109 of the release ring 6 into that of the stationary stop member 139. Now the ring 107 does not participate in further release and cocking movements of the release ring 6. It remains together with its associated members 10, 12, 94, 95 in the cocked position. The exposure time and diaphragm aperture rings 94, 95 retain their basic positions which results in the maximum exposure time and the largest diaphragm aperture. The diaphragm aperture in each case most suitable for flash light use is set by hand through operation of the ring 116 along the scale 119 which adjusts the second diaphragm cage 97 in relation to the first (95) now remaining stationary in the same position. The exposure time remains always the same, e.g., 1/30 second. In the release of the camera through disengagement of the latch 88 the cocking members 72, 105 and the release ring 6 alone are released and the latter effects the exposure at the end of the release movement through action of its projection 18 on the release member 21 of the shutter over the lever pair 20. In the renewed cocking by which the shutter mechanism again is cocked, the release ring 6 also participates alone. The necessary free wheeling in relation to the ring 107 results from a unidirectional, in the cocking direction acting connection in that, e.g., the coupling pin 108 between the rings 107 and 10 constitutes a connection means with the release ring 6 and at the same time moves in a properly dimensioned slot 120 (FIG. 4) in the release ring 6.

The described disconnection of the automatic exposure mechanism, to which furthermore a sensing device as explained below belongs, is maintained over the entire range of the scale 119. It is true that in the shown device (FIGS 3 and 5) in the change from the position "A" to the scale 119 for the flash light operation the maximum diaphragm aperture is lost which is achievable in the shutter in the case of automatic control. If desired, this can, however, be remedied without difficulty by causing the second diaphragm cage 97 not to participate in the transfer movement but only to be brought forward by the actuation ring 116 in the range of the scale 119. The fixed connection assumed in FIG. 3 between the adjustment ring 114 and the diaphragm cage 97 is then eliminated. It is, e.g., replaced by a yielding clamp on the adjustment ring 114 which at the arrival of the actuation ring 116 from the "A" position in the first scale position engages the diaphragm cage 97, which is in a predetermined end position and preferably yieldingly retained there by a spring, and together with the ridge 113 moves the same over the scale range 119 and also back until a reverse adjustment of the actuation ring 116 to "A" disconnects the clamp connection in that the diaphragm cage 97 through abutment is stopped in its previous end position.

The entire exposure time and diaphragm aperture mechanism 94, 95, 97, 114, 116 for the automatic control and for the manual setting of the camera, including the cocking and release means 6, 107, 108 for said mechanism and for the member 10, 12 (abutment stairs) which cooperates with the light meter controlled catch member, may as shown advantageously be combined into a structural unit in the objective shutter. This needs then as outlets for connection with members in the camera body only a drive member, the pinion 105, as well as a member for cooperation with the means controlled by the light meter. Said second outlet may as shown be the coupling pin 108 for connection with the abutment stairs 12 when the latter is provided in the camera body which is advantageous.

What we claim is:

1. In a camera with automatic exposure control according to time and diaphragm aperture, an objective shutter, diaphragm aperture means, exposure time means, means interconnecting said diaphragm aperture means and said exposure time means over a mutual adjustment range in such a way that adjustment in one direction causes reduction of the exposure time and diaphragm aperture values while adjustment in the opposite direction causes increase of both said values, means defining abutment stairs, catch means cooperating with said abutment stairs, a light meter, means for controlling said catch means by said light meter, means for cocking the camera, means including a release ring for leasing the cocked camera, means connecting said cocking and release means with said exposure time and diaphragm aperture means in such a way that cocking of the camera causes movement of the exposure time and diaphragm aperture means to one end position of said range while release of the camera causes movement of said exposure time and diaphragm aperture means in direction towards the other end position of the range until said catch means engages a step of said abutment stairs whereupon said release ring automatically releases the shutter, and means coordinating the release movement of said release ring with that of said diaphragm aperture and exposure time means in such a way as to effect properly timed succession of camera setting and shutter release, said coordinating means comprising differential gear means, a planet wheel rim in said differential gear means, ring means connected with the diaphragm aperture and exposure time means, means connecting said differential gear means with said release ring and said ring means, actuating means for said shutter release, and means securing said actuating means to the planet wheel rim of said differential gear means.

2. The camera as set forth in claim 1, in which said release ring and said ring means constitute the sun wheels in said differential gear means.

3. In a camera with automatic exposure control according to time and diaphragm aperture, an objective shutter, diaphragm aperture means, exposure time means, means including a first diaphragm cage interconnecting said diaphragm aperture means and said exposure time means over a mutual adjustment range in such a way that adjustment in one direction causes reduction of the exposure time and diaphragm aperture values while adjustment in the opposite direction causes increase of both said values, means defining abutment stairs, catch means cooperating with said abutment stairs, a light meter, means for controlling said catch means by said light meter, means for cocking the camera, means including a release ring for releasing the cocked camera, means connecting said cocking and release means with said exposure time and diaphragm aperture means in such a way that cocking of the camera causes movement of the exposure time and diaphragm aperture means to one end position of said range while release of the camera causes movement of said exposure time and diaphragm aperture means in direction towards the other end position of the range until said catch means engages a step of said abutment stairs whereupon said release ring automatically releases the shutter, means coordinating the release movement of said release ring with that of said diaphragm aperture and exposure time means in such a way as to effect properly timed succession of camera setting and shutter release, said coordinating means comprising differential gear means, a planet wheel rim in said differential gear means, ring means connected with the diaphragm aperture and exposure time means, means connecting said differential gear means with said release ring and said ring means, actuating means for said shutter release, and means securing said actuating means to the planet wheel rim of said differential gear means, said release ring and said ring means constituting the sun wheels in said differential gear means, and means for disconnection of said automatic control means to permit use of the camera with manual operation.

4. The camera as set forth in claim 3, in which said disconnection means includes reversible coupling means, and a division of said differential gear means enabling said release ring to be disconnected from said diaphragm aperture and exposure time means, said diaphragm aperture and exposure time means to be blocked, and said diaphragm aperture means to be operated by a second diaphragm cage.

5. The camera as set forth in claim 4, in which one of said sun wheels includes bevel gear means, and releasable coupling means on said one sun wheel which in unreleased condition secures said bevel gear means to said one sun wheel.

6. In a camera with automatic exposure control according to time and diaphragm aperture, an objective shutter, diaphragm aperture means, exposure time means, means including a first diaphragm cage interconnecting said diaphragm aperture means and said exposure time means over a mutual adjustment range in such a way that adjustment in one direction causes reduction of the exposure time and diaphragm aperture values while adjustment in the opposite direction causes increase of both said values, means defining abutment stairs, catch means cooperating with said abutment stairs, a light meter, means for controlling said catch means by said light meter, means for cocking the camera, means including a release ring for releasing the cocked camera, means connecting said cocking and release means with said exposure time and diaphragm aperture means in such a way that cocking of the camera causes movement of the exposure time and diaphragm aperture means to one end position of said range while release of the camera causes movement of said exposure time and diaphragm aperture means in direction towards the other end position of the range until said catch means engages a step of said abutment stairs whereupon said release ring automatically releases the shutter, means coordinating the release movement of said release ring with that of said diaphragm aperture and exposure time means in such a way as to effect properly timed succession of camera setting and shutter release, said coordinating means comprising differential gear means, a planet wheel rim in said differential gear means, ring means connected with the diaphragm aperture and exposure time means, means connecting said differential gear means with said release ring and said ring means, actuating means for said shutter release, and means securing said actuating means to the planet wheel rim of said differential gear means, said release ring and said ring means constituting the sun wheels in said differential gear means, means for disconnection of said automatic control means to permit use of the camera with manual operation, said disconnection means including reversible coupling means and a division of said differential gear means enabling said release ring to be disconnected from said diaphragm aperture and exposure time means, said diaphragm aperture and exposure time means to be blocked, and said diaphragm aperture means to be operated by a second diaphragm cage, one of said sun wheels including bevel gear means, and releasable coupling means on said one sun wheel which in unreleased condition secures said bevel gear means to said one sun wheel, said releasable coupling means comprising latch means, means pivotally connecting said latch means to said one sun wheel in a substantially radial relation thereto, a coupling nose on said latch means, kidney-shaped recess means in said bevel gear means for cooperation with said coupling nose, actuating ring means adjacent to said latch means, abutment means on said actuating ring means, and shoulder means on the camera casing, said abutment means causing release of said coupling nose from said recess means and movement of said latch means into engagement with said shoulder means when said actuating ring means is moved from its position for automatic to its position for manual operation of the camera.

7. In a camera with automatic exposure control according to time and diaphragm aperture, an objective shutter, diaphragm aperture means, exposure time means, means including a first diaphragm cage interconnecting said diaphragm aperture means and said exposure time means over a mutual adjustment range in such a way that adjustment in one direction causes reduction of the exposure time and diaphragm aperture values while adjustment in the opposite direction causes increase of both said values, means defining abutment stairs, catch means cooperating with said abutment stairs, a light meter, means for controlling said catch means by said light meter, means for cocking the camera, means including a release ring for releasing the cocked camera, means connecting said cocking and release means with said exposure time and diaphragm aperture means in such a way that cocking of the camera causes movement of the exposure time and diaphragm aperture means to one end position of said range while release of the camera causes movement of said exposure time and diaphragm aperture means in direction towards the other end position of the range until said catch means engages a step of said abutment stairs whereupon said release ring automatically releases the shutter, means coordinating the release movement of said release ring with that of said diaphragm aperture and exposure time means in such a way as to effect properly timed succession of camera setting and shutter release, said coordinating means comprising differential gear means, a planet wheel rim in said differential gear means, ring means connected with the diaphragm aperture and exposure time means, means connecting said differential gear means with said release ring and said ring means, actuating means for said shutter release, and means securing said actuating means to the planet wheel rim of said differential gear means, said release ring and said ring means constituting the sun wheels in said differential gear means, means for disconnection of said automatic control means to permit use of the camera with manual operation, said disconnection means including reversible coupling means and a division of said differential gear means enabling said release ring to be disconnected from said diaphragm aperture and exposure time means, said diaphragm aperture and exposure time means to be blocked, and said diaphragm aperture means to be operated by a second diaphragm cage, one of said sun wheels including bevel gear means, and releasable coupling means on said one sun wheel which in unreleased condition secures said bevel gear means to said one sun wheel, said releasable coupling means comprising latch means, means pivotally connecting said latch means to said one sun wheel in a substantially tangential relation thereto, a coupling nose on said latch means, projecting means on said bevel gear means for cooperation with said coupling nose, actuating ring means adjacent to said latch means, abutment means on said actuating ring means, and shoulder means on the camera casing, said abutment means causing release of said coupling nose from said projecting means and movement of said latch means into engagement with said shoulder means when said actuating ring means is moved from its position for automatic to its position for manual operation of the camera.

8. In a camera with automatic exposure control according to time and diaphragm aperture, an objective shutter, diaphragm aperture means, exposure time means, means interconnecting said diaphragm aperture means and said exposure time means over a mutual adjustment range in such a way that adjustment in one direction causes reduction of the exposure time and diaphragm aperture values, while adjustment in the opposite direction causes increase of both said values, means defining abutment stairs, catch means cooperating with said abutment stairs, a light meter, means for controlling said catch means by said light meter, means for cocking the camera, means including a release ring for releasing the cocked camera, means connecting said cocking and release means with said exposure time and diaphragm aperture means in such a way that cocking of the camera causes movement of the exposure time and diaphragm aperture means to one end position of said range, while release of the camera causes movement of said exposure time and diaphragm aperture means in direction towards the other end position of the range until said catch means engages a step of said abutment stairs whereupon said release ring automatically releases the shutter, and means coordinating the release movement of said release ring with that of said diaphragm aperture and exposure time means in such a way as to effect properly timed succession of camera setting and shutter release, said coordinating means comprising delaying means, and means operatively connecting said delaying means with said release ring.

9. The camera as claimed in claim 8, in which said delaying means comprises an escapement mechanism.

References Cited in the file of this patent
UNITED STATES PATENTS

| | | |
|---|---|---|
| 2,325,463 | Axler | July 27, 1943 |
| 2,868,095 | Gebele | Jan. 13, 1959 |
| 2,913,969 | Faulhaber | Nov. 24, 1959 |
| 2,925,760 | Broschke | Feb. 23, 1960 |
| 2,930,282 | Herterich | Mar. 29, 1960 |
| 2,969,004 | Gebele | Jan. 24, 1961 |
| 2,999,438 | Nerwin | Sept. 12, 1961 |
| 2,999,440 | Nerwin | Sept. 12, 1961 |